US012603322B2

(12) United States Patent
Katagiri et al.

(10) Patent No.: US 12,603,322 B2
(45) Date of Patent: Apr. 14, 2026

(54) NONWOVEN FABRIC MADE OF THICK AND THIN FIBERS, AND SOLID ELECTROLYTE SHEET INCLUDING THE SAME

(71) Applicant: ENTEK Asia Inc, Gifu (JP)

(72) Inventors: Yuji Katagiri, Tokyo (JP); Takahiro Ohara, Tokyo (JP)

(73) Assignee: ENTEK ASIA INC, Gifu (JP)

( * ) Notice: Subject to any disclaimer, the term of this patent is extended or adjusted under 35 U.S.C. 154(b) by 618 days.

(21) Appl. No.: 17/922,474

(22) PCT Filed: Apr. 13, 2021

(86) PCT No.: PCT/JP2021/015355
§ 371 (c)(1),
(2) Date: Oct. 31, 2022

(87) PCT Pub. No.: WO2021/229981
PCT Pub. Date: Nov. 18, 2021

(65) Prior Publication Data
US 2023/0170523 A1      Jun. 1, 2023

(30) Foreign Application Priority Data
May 11, 2020      (JP) ................................. 2020-083498

(51) Int. Cl.
H01M 10/0562          (2010.01)
H01M 10/0525          (2010.01)

(52) U.S. Cl.
CPC ... H01M 10/0562 (2013.01); H01M 10/0525 (2013.01); H01M 2300/0068 (2013.01)

(58) Field of Classification Search
CPC ...................... H01M 10/0562; H01M 10/0525
USPC ................................................. 429/188, 322
See application file for complete search history.

(56) References Cited

U.S. PATENT DOCUMENTS

| 2004/0224594 A1 | 11/2004 | Choi et al. | |
| 2015/0372269 A1* | 12/2015 | Sato .................. | H01M 10/0525 |
| | | | 429/249 |
| 2020/0303778 A1* | 9/2020 | Nogami ................ | H01M 4/483 |
| 2021/0036290 A1* | 2/2021 | Kiyama .............. | H01M 50/409 |

FOREIGN PATENT DOCUMENTS

| CN | 110690495 A | 1/2020 | |
| JP | 2006-212582 A | 8/2006 | |
| JP | 2010-192361 A | 9/2010 | |
| JP | 2013-127982 A | 6/2013 | |
| JP | 2014-96311 A | 5/2014 | |
| JP | 2015-153460 A | 8/2015 | |
| JP | 2016-31789 A | 3/2016 | |
| WO | 2018/151058 A1 | 8/2018 | |
| WO | WO-2019078130 A1 * | 4/2019 | ............ H01M 10/04 |
| WO | WO-2019198500 A1 * | 10/2019 | .......... H01M 50/443 |

OTHER PUBLICATIONS

International Search Report and Written Opinion of the International Searching Authority issued in International Patent Application No. PCT/JP2021/015355, dated Jul. 6, 2021, along with an English translation thereof.

* cited by examiner

*Primary Examiner* — Sean P Cullen
(74) *Attorney, Agent, or Firm* — Greenblum & Bernstein, P.L.C.

(57) ABSTRACT

The invention is a nonwoven fabric characterized by satisfying $0.25 \leq (L^2/V) \leq 10$, when an average fiber diameter of all fibers is L (μm) and a volume per $m^2$ is V ($cm^3$). The nonwoven fabric leads to a solid electrolyte-carrying sheet in which solid electrolyte particles are carried between fibers and which can achieve a good balance among thickness reduction, powder falling property of the solid electrolyte particles, and electrical conductivity.

9 Claims, No Drawings

NONWOVEN FABRIC MADE OF THICK AND THIN FIBERS, AND SOLID ELECTROLYTE SHEET INCLUDING THE SAME

TECHNICAL FIELD

The present invention relates to a solid electrolyte-carrying sheet in which solid electrolyte particles are carried between fibers, and to a nonwoven fabric suitable for the formation thereof.

BACKGROUND ART

Even after all-solid-state lithium-ion batteries have been put into practical use, research has been actively conducted. In such all-solid-state lithium-ion batteries, a solid electrolyte-containing sheet mainly including a solid electrolyte that contains a sulfide or the like is used as a material for forming a solid electrolyte layer. The solid electrolyte is generally particulate, and it is difficult to form a sheet from the solid electrolyte alone. Thus, attempts have been made to mix the solid electrolyte with a thermoplastic resin to form a sheet, or composite solid electrolyte particles (their particle diameter is usually 1 to ten and several $\mu m$) with a sheet-shaped reinforcing material (support) having voids.

For example, Patent Literature 1 discloses a solid electrolyte sheet including: a glass solid electrolyte containing at least a lithium element (Li) and a sulfur element (S); and a support composed of electron-insulating inorganic fibers, and proposes a solid electrolyte sheet using glass paper mainly composed of glass chopped strand-shaped fibers as the support. In the case of a glass nonwoven fabric, a chopped strand of long glass fibers (6 to 11 $\mu m$ diameter, several to ten and several mm length) is subjected to papermaking, and a wet paper web is impregnated with an organic binder resin to impart strength. An amount of the organic binder resin is around 10%.

Patent Literature 2 discloses a solid electrolyte sheet in which an opening of a support composed of a glass fiber fabric is filled with a solid electrolyte.

Further, Patent Literature 3 discloses a solid electrolyte sheet containing a sheet-shaped porous base material and an inorganic solid electrolyte material filled in voids of the porous base material, and a PET nonwoven fabric or a natural fiber/PET/acrylic resin coated nonwoven fabric is used as the porous base material.

Here, the solid electrolyte in the solid electrolyte-containing sheet for use in manufacturing the solid electrolyte layer of the all-solid-state lithium-ion battery preferably has as high uniformity as possible. In order to manufacture a solid electrolyte-containing sheet more uniformly containing a solid electrolyte by using a sheet-shaped reinforcing material (support) and solid electrolyte particles, either a dry method or a wet method can be applied, but a wet method is desirable.

PRIOR ART LITERATURE

Patent Literature

Patent Literature 1: JP 2014-96311 A
Patent Literature 2: JP 2013-127982 A

Patent Literature 3: JP 2015-153460 A

SUMMARY OF INVENTION

Problems that the Invention is to Solve

The technique described in the Patent Literature 1 involves a problem that, even though a nonwoven fabric composed of thick glass fibers (6 to 11 $\mu m$ diameter) is used as the reinforcing material and solid electrolyte particles are once disposed by a wet method, powder falling is easily caused by subsequent handling. It is conceivable to use an adhesive in combination for improving the powder falling property, but an adhesive component does not have ionic conductivity, resulting in a problem of reduction in electrical conductivity.

When thin fibers are used, the powder falling property is improved, but there is a problem that the solid electrolyte particles are difficult to be uniformly arranged over the entire nonwoven fabric including the inside, and that the desired conductivity cannot be obtained.

An object of the present invention is to provide a solid electrolyte-carrying sheet in which solid electrolyte particles are carried between fibers and which can achieve a good balance among thickness reduction, powder falling property of the solid electrolyte particles, and electrical conductivity, and a nonwoven fabric suitable for the formation thereof.

Means for Solving the Problems

The present invention is as follows.

(1) A nonwoven fabric which is characterized by satisfying $0.25 \leq (L^2/V) \leq 10$, when an average fiber diameter of all fibers is L ($\mu m$) and a volume per $m^2$ is V ($cm^3$).

Hereinafter, the calculation formula $L^2/V$ is referred to as "index of mesh opening".

(2) The nonwoven fabric according to above (1) which includes (F1) fibers having a fiber diameter of 1.0 $\mu m$ or thinner and (F2) fibers having a fiber diameter of thicker than 1.0 $\mu m$.

(3) The nonwoven fabric according to above (1) or (2), wherein the average fiber diameter is 0.85 $\mu m$ or thicker.

(4) The nonwoven fabric according to above (2) or (3), wherein the fibers (F1) include an inorganic fiber.

(5) The nonwoven fabric according to any one of above (2) to (4), wherein the fibers (F2) include a resin fiber.

(6) The nonwoven fabric according to above (5), wherein the fibers (F2) further include an inorganic fiber.

(7) The nonwoven fabric according to above (5) or (6), wherein at least some of the resin fibers join the fibers constituting the nonwoven fabric.

(8) The nonwoven fabric according to any one of above (1) to (7), which is used for carrying solid electrolyte particles.

(9) A solid electrolyte-carrying sheet which is characterized by including solid electrolyte particles carried between the fibers constituting the nonwoven fabric according to any one of above (1) to (8).

(10) The solid electrolyte-carrying sheet according to above (9), wherein an amount of the solid electrolyte particles carried is in a range from 10 to 200 $g/m^2$.

Effects of the Invention

Since the nonwoven fabric of the present invention has an index of mesh opening falling within a specific range, the voids of the nonwoven fabric are easily filled with the solid electrolyte particles, and it is suitable as a material for forming a solid electrolyte-carrying sheet having a suppressed powder falling property of the solid electrolyte particles and having the intended electrical conductivity.

The solid electrolyte-carrying sheet of the present invention can achieve a good balance among thickness reduction, powder falling property of the solid electrolyte particles, and electrical conductivity, and is suitable as a member for manufacturing an all-solid-state lithium-ion battery.

DESCRIPTION OF EMBODIMENTS

The nonwoven fabric of the present invention is one obtained, for example, by accumulating raw material fibers in a certain direction or at random and binding the accumulated raw material fibers with an adhesive, mechanically entangling the raw material fibers as in papermaking, entangling the raw material fibers with a water flow under pressure, or binding the raw material fibers with heat fusible fibers, and the nonwoven fabric is a fiber assembly satisfying the following formula (1).

$$0.25 \leq (L^2/V) \leq 10 \qquad (1)$$

In the formula (1), Lis an average fiber diameter (μm) of all the fibers constituting the nonwoven fabric, and V is a volume per m² of the nonwoven fabric (cm³/m², hereinafter referred to as "occupied volume").

In the present invention, the diameter of a fiber (fiber diameter) means a major axis when the fiber is viewed in a cross section. In the formula (1), the average fiber diameter Lis a value calculated from the following formula (2) after calculation of a BET specific surface area (m²/g) and an average density (g/cm³) of the nonwoven fabric, and the occupied volume Vis a value calculated from a basis weight (g/m²) of the nonwoven fabric, a density and a content ratio of each fiber contained in the nonwoven fabric and, if necessary, an adhesive and a density thereof.

Average density=Σ[density of individual fibers×content ratio (% by mass)/100]

Average fiber diameter $L$=4/[BET specific surface area (m²/g)×average density (g/cm³)]     (2)

In the formula (1), the lower limit of the index of mesh opening (L²/V) is 0.25, preferably 0.5, and more preferably 1.0 from a viewpoint of the electrical conductivity of the solid electrolyte-carrying sheet obtained using the nonwoven fabric of the present invention. Since the powder falling property of the solid electrolyte particles from the manufactured solid electrolyte-carrying sheet is suppressed, the upper limit is 10, preferably 8.0, more preferably 6.0, further preferably 5.5, and particularly preferably 3.0. It is meant that the higher the index value of mesh opening is, the larger the mesh opening (gap between the fibers) is.

A fiber constituting the nonwoven fabric of the present invention is not particularly limited, and may be any of an inorganic fiber, an organic fiber, an organic-inorganic composite fiber, and a natural fiber. In addition, a combination of two or three kinds of these fibers may be used.

A constituent material for the inorganic fiber is not particularly limited, and is preferably an inorganic compound such as an oxide, a nitride, a carbonate, and a titanate. Specific examples of the inorganic fiber include a mineral fiber such as a glass fiber, a silica fiber, an alumina fiber, a silica-alumina fiber, a silica-alumina-magnesia fiber, a silica-alumina-zirconia fiber, a silica-magnesia-calcia fiber, a rock wool, a slag wool, a potassium titanate whisker, a calcium carbonate whisker, a basalt fiber, sepiolite and attapulgite; a carbon-based fiber such as cellulose nanofiber, and the like. Among them, a glass fiber is preferred.

Glass constituting the glass fiber is not particularly limited. In the solid electrolyte-carrying sheet obtained using the nonwoven fabric of the present invention, the fiber and the solid electrolyte (which will be described later) are in contact with each other. C glass, B glass, E glass, and the like are preferred because, when such a solid electrolyte-carrying sheet is used in an all-solid-state lithium-ion battery, the glass fibers and the solid electrolyte particles are stable and durability is obtained.

The organic fiber is preferably a resin fiber. Examples of the constituent material for the resin fiber include a polyester resin such as polyethylene terephthalate, an aliphatic polyamide resin, an aramid resin, a polyolefin resin, a cyclic olefin resin, an acrylic resin, a polyacrylonitrile resin, a polyvinyl alcohol resin, a polyacetal resin, a polyvinyl chloride resin, a polyvinylidene chloride resin, an ethylene vinyl acetate copolymer, a fluororesin, a polyether sulfone resin, a polyphenylene sulfide resin, a cellulose, and the like. The resin fiber may be one composed of a single phase containing only one kind of resins or a plurality of kinds of resins, or one having a dual-phase structure including a low melting point resin portion and a high melting point resin portion (hereinafter, referred to as "composite resin fiber"). In the case of the composite resin fiber, a core-sheath type fiber, a side-by-side type fiber, or the like can be used. Examples of the combination of resins in the case of the composite resin fiber include PET/low melting point copolymerized polyester, PET/PE, PP (polypropylene)/PE (polyethylene), PP/low melting point copolymerized PP, and the like. Here, examples of the low melting point copolymerized polyester include a modified resin having PET, PPT (polypropylene terephthalate), PBT (polybutylene terephthalate), or the like as a basic skeleton, that is, a modified copolymer of the polyester with an aromatic dicarboxylic acid such as isophthalic acid, 5-sodium sulfoisophthalic acid, and naphthalenedicarboxylic acid, and/or an aliphatic dicarboxylic acid such as adipic acid and sebacic acid, and an aliphatic polyhydric alcohol such as diethylene glycol, propylene glycol, and 1,4-butanediol.

As the organic fiber (resin fiber), a polyester fiber (resin fiber) are particularly preferred.

Examples of the organic/inorganic composite fiber include a fiber having a film or granular portion containing an inorganic material at least partially in surfaces of a resin fiber.

Examples of the natural fiber include a plant fiber, an animal fiber, and the like.

The nonwoven fabric of the present invention preferably contains an inorganic fiber. When solid electrolyte particles are carried on a nonwoven fabric containing inorganic fibers and then pressure-molded to form a thin solid electrolyte-carrying sheet, the inorganic fibers act as a reinforcing material. Therefore, the resulting sheet has excellent mechanical strength. In addition, heat resistance can be imparted to the solid electrolyte-carrying sheet.

When the nonwoven fabric of the present invention contains inorganic fibers, a content ratio of the inorganic fibers constituting the nonwoven fabric is preferably 40% by mass or more with respect to a total amount of the fibers.

The nonwoven fabric of the present invention particularly preferably contains an inorganic fiber and an organic fiber (including one derived from a composite resin fiber) in combination, from viewpoints of the carrying property of the solid electrolyte particles and mechanical strength of the nonwoven fabric. Content ratios of the inorganic fiber and the organic fiber are preferably 40% to 70% by mass and 30% to 60% by mass, and more preferably 50% to 70% by mass and 30% to 50% by mass, respectively, when a total content ratio of these fibers is 100% by mass.

When the nonwoven fabric of the present invention contains an organic fiber derived from a composite resin fiber including a low melting point resin portion and a high melting point resin portion, the organic fiber may be contained as a fiber not including the low melting point resin portion of the composite resin fiber.

A fiber diameter of the fibers constituting the nonwoven fabric of the present invention is not particularly limited. It is preferably in a range from 0.1 to 20 μm, and more preferably from 0.2 to 10 μm from a viewpoint of the mechanical strength of the nonwoven fabric. A fiber length of the fibers is not particularly limited. It is preferably in a range from 0.1 to 10 mm, and more preferably from 0.5 to 6 mm from a viewpoint of the mechanical strength of the nonwoven fabric. The nonwoven fabric is composed of a plurality of fibers. Among the fibers containing the same material, sizes (diameters or lengths) of the respective fibers may be either uniform or non-uniform in the present invention. When the nonwoven fabric of the present invention includes plural kinds of fibers in which constituent materials are different from each other, diameters or lengths of a fiber composed of one material and another fiber composed of the other material may be either uniform or non-uniform.

The nonwoven fabric of the present invention preferably contains two or more kinds of fibers having different fiber diameters from each other. In this case, with respect to the average fiber diameter of the fibers contained in the nonwoven fabric, a lower limit value is preferably 0.85 μm, more preferably 0.90 μm, and further preferably 0.95 μm, and an upper limit is preferably 6 μm, more preferably 5 μm, and further preferably 3.5 μm, because the voids of the nonwoven fabric are easily filled with the solid electrolyte particles, and the powder falling property of the solid electrolyte particles is suppressed.

The nonwoven fabric sufficiently exhibiting the effects of the present invention is one in which fibers having a fiber diameter of 1.0 μm or thinner (hereinafter, referred to as "fibers (F1)") and fibers having a fiber diameter of thicker than 1.0 μm (hereinafter, referred to as "fibers (F2)") are combined. Content ratios of the fibers (F1) and the fibers (F2) are preferably 2% to 70% by mass and 30% to 98% by mass, and more preferably 5% to 65% by mass and 35% to 95% by mass, respectively, when a total content ratio of these fibers is 100% by mass.

In a preferred embodiment of the present invention, the fibers (F1) include fibers having a fiber diameter of 0.1 to 1.0 μm (hereinafter, referred to as "fibers (F1-1)") in an amount of preferably 40% to 100% by mass, and more preferably 60% to 100% by mass with respect to the entire fibers. Therefore, the fibers (F1) may be of a combination of the fibers (F1-1) and fibers having a fiber diameter of thinner than 0.1 μm.

A constituent material for the fibers (F1) is not particularly limited. The fibers (F1) preferably contain an inorganic fiber. In a preferred embodiment of the present invention, the fibers (F1) include an inorganic fiber in an amount of preferably 40% to 100% by mass, more preferably 50% to 100% by mass, and particularly 70% to 100% by mass with respect to the entire fibers. Therefore, the fibers (F1) may be of a combination of an inorganic fiber and other fibers such as an organic fiber, an organic/inorganic composite fiber, and a natural fiber. The other fibers preferably include an organic fiber.

In a preferred embodiment of the present invention, the fibers (F2) include fibers having a fiber diameter of thicker than 1.0 μm and 20 μm or thinner (hereinafter, referred to as "fibers (F2-1)") in an amount of preferably 30% to 100% by mass, and more preferably 50% to 100% by mass with respect to the entire fibers. Therefore, the fibers (F2) may be of a combination of the fibers (F2-1) and fibers having a fiber diameter of thicker than 20 μm.

A constituent material for the fibers (F2) is not particularly limited. The fibers (F2) preferably contain an organic fiber (resin fiber). In a preferred embodiment of the present invention, the fibers (F2) include a resin fiber in an amount of preferably 30% to 100% by mass, and more preferably 50% to 100% by mass with respect to the entire fibers. Therefore, the fibers (F2) may be a combination of a resin fiber and other fibers such as an inorganic fiber, an organic/inorganic composite fiber, and a natural fiber. The other fibers preferably include an inorganic fiber.

The nonwoven fabric of the present invention is a fiber assembly, and may be either a nonwoven fabric in which fibers are simply entangled with each other or a nonwoven fabric in which fibers are entangled with each other and joined to each other. In the present invention, the latter nonwoven fabric is preferred, and it is preferable that its fibers be in a joined state by an adhesive at a contact point between the fibers.

The adhesive for joining the fibers to each other is not particularly limited, and examples thereof include a thermoplastic resin adhesive containing polyethylene, polypropylene, an ethylene propylene copolymer, an ethylene vinyl acetate copolymer, polyvinyl chloride, polyvinylidene chloride, polystyrene, polyvinyl acetate, an acrylic resin, a polyester resin, a polyamideimide resin, an acrylonitrile butadiene copolymer, a styrene butadiene copolymer, an acrylonitrile styrene butadiene copolymer, or the like; a curable resin adhesive containing a urethane resin, a melamine resin, a urea resin, a thermosetting acrylic resin, a phenol resin, an epoxy resin, a thermosetting polyester, or the like; an aqueous resin adhesive containing an acrylic resin emulsion or the like; an inorganic adhesive such as colloidal silica, water glass, calcium silicate, a silica sol, and an alumina sol; and the like. When these adhesives are used, the joined portion is usually composed of a thermoplastic resin, a cured resin, or the like.

The adhesive may be derived from a core-sheath type fiber, a side-by-side type fiber, or the like, which is a composite resin fiber.

When the nonwoven fabric of the present invention contains an adhesive, a content ratio of the adhesive to the nonwoven fabric is preferably 10% by mass or less, and more preferably 6% by mass or less in order to ensure that an electrical conductivity when it is used as a solid electrolyte-carrying sheet does not excessively decrease from that of the solid electrolyte particles themselves.

In the present invention, a basis weight of the nonwoven fabric is preferably in a range from 1 to 9 g/m², and more preferably from 2 to 6 g/m² from a viewpoint of the carrying property of the solid electrolyte particles. A thickness of the nonwoven fabric is usually 10 μm or more. When the nonwoven fabric is used as a material for forming a solid electrolyte-carrying sheet having the intended conductivity, it is preferably in a range from 12 to 60 μm, and more preferably from 15 to 50 μm. A porosity of the nonwoven fabric is preferably in a range from 70% to 95%, and more preferably from 80% to 95%.

A method for manufacturing the nonwoven fabric of the present invention is not particularly limited, and may be a conventionally known method such as a method of making paper from a slurry containing raw material fibers and an adhesive, and a method of producing a fiber aggregate using raw material fibers containing composite resin fibers and then heat-treating the fiber aggregate. When inorganic fibers are used as the raw material fibers, a fiber diameter thereof is preferably in a range from 0.1 to 6.0 μm, and more preferably from 0.2 to 4.0 μm. In a case of using a plurality of inorganic fibers having different fiber diameters from each other, when the inorganic fibers are used so as to contain inorganic fibers having a fiber diameter of 1.0 μm or smaller, a nonwoven fabric having the preferred basis weight and excellent mechanical strength can be obtained. In addition, when a nonwoven fabric is manufactured by papermaking, wet paper strength can be maintained. When organic fibers are used, a fiber diameter thereof is preferably in a range from 1 to 20 μm, and more preferably from 1 to 10 μm. When composite resin fibers are used as the organic fibers, a fiber diameter thereof is preferably in a range from 2 to 20 μm, and more preferably from 2 to 10 μm.

The nonwoven fabric of the present invention is an article suitable for forming a solid electrolyte-carrying sheet in which solid electrolyte particles are carried between fibers. The nonwoven fabric may also be used in other fields, for example, as a reinforcing material for a resin product, a base material for impregnation or immersion, and the like.

The solid electrolyte-carrying sheet of the present invention is an article in which particles composed of a solid electrolyte are carried in voids between fibers constituting a nonwoven fabric. When an all-solid-state lithium-ion battery is manufactured, a pressure-molded thin solid electrolyte-carrying sheet (hereinafter, referred to as a "thin sheet") is usually used, but the present invention includes not only the solid electrolyte-carrying sheet before pressure molding but also a pressure-molded thin sheet. The thin sheet is preferably a plate-shaped sheet having no air permeability from one surface side to the other surface side, and has a continuous phase composed of solid electrolyte particles in a portion where the solid electrolyte particles are in contact with each other.

A thickness of the solid electrolyte-carrying sheet before pressure molding is usually the same as or larger than the thickness of the nonwoven fabric of the present invention.

A thickness of the thin sheet is preferably in a range from 1 to 200 μm, and more preferably from 10 to 50 μm.

The solid electrolyte is not particularly limited as long as it is used in an all-solid-state lithium-ion battery. Examples of the preferred solid electrolyte include a sulfide-based solid electrolyte, an oxide-based solid electrolyte, and the like. The solid electrolyte may be any of amorphous, glassy, and crystalline (crystallized glass). Specific examples thereof include a $Li_2S—P_2S_5$ material, a $Li_2S—SiS_2$ material, a $Li_2S—GeS_2$ material, a $Li_2S—Al_2S_3$ material, a $Li_2S—SiS_2—Li_3PO_4$ material, a $Li_2S—P_2S_5—GeS_2$ material, a $Li_2S—Li_2O—P_2S_5—SiS_2$ material, a $Li_2S—GeS_2—P_2S_5—SiS_2$ material, a $Li_2S—SnS_2—P_2S_5—SiS_2$ material, and the like.

The solid electrolyte particles contained in the solid electrolyte-carrying sheet of the present invention may be one kind or two or more kinds.

A particle diameter of the solid electrolyte particle is preferably in a range from 1 to 20 μm, and more preferably from 1 to 10 μm. The particle diameter can be measured by image analysis using an electron microscope.

A content (carried amount) of the solid electrolyte particles in the solid electrolyte-carrying sheet of the present invention is preferably in a range from 10 to 200 g/m², and more preferably from 20 to 100 g/m².

A method for manufacturing the solid electrolyte-carrying sheet of the present invention is not particularly limited. A preferred method is one in which a dispersion liquid obtained by dispersing solid electrolyte particles in a dispersion medium is applied to a nonwoven fabric, and then dried under normal pressure or reduced pressure. When drying is conducted, heating may be performed in consideration of the possibility of change in crystallinity or the like of the solid electrolyte.

A concentration of the solid electrolyte particles in the dispersion liquid is not particularly limited. The dispersion medium is not particularly limited as long as it does not dissolve or alter the fibers of the nonwoven fabric.

The dispersion liquid may contain an adhesive.

Examples of a method for applying the dispersion liquid include a roll coater method, a gravure coater method, a knife coater method, a kiss coater method, a die coater method, a screen coating method, a doctor blade method, a bar coating method, a curtain coater method, a spin coating method, a dip method, a casting method, a spray method, an extrusion coater method, and the like.

After that, in the case of manufacturing a thin sheet, a method using a pressing machine, a roll pressing method of passing a material between two rolls, and the like may be applied. A pressure during pressurization is preferably in a range from 10 to 100 MPa.

The thin sheet of the present invention may also be manufactured by applying the dispersion liquid to a nonwoven fabric directly containing composite resin fibers including a high melting point resin portion and a low melting point resin portion, drying the dispersion liquid-applied nonwoven fabric without melting the low melting point resin to devolatilize the dispersion medium, thereby producing a solid electrolyte particle-attached nonwoven fabric (included in the solid electrolyte-carrying sheet of the present invention), and then pressurizing the nonwoven fabric at a temperature at which the high melting point resin does not melt and the low melting point resin melts.

When the thin sheet of the present invention is subjected to a conventionally known all-solid-state lithium-ion battery production method using a positive electrode material, a negative electrode material, and the like, an all-solid-state lithium-ion battery having excellent structural stability can be manufactured. In the resultant all-solid-state lithium-ion battery, the thin sheet acts as a solid electrolyte layer. The solid electrolyte layer may be thinner than the thin sheet.

EXAMPLES

Hereinafter, embodiments of the present invention will be described more specifically with reference to Examples and Comparative Examples.

The solid electrolyte used in Examples and Comparative Examples was obtained in Synthesis Example 1 below.

Synthesis Example 1

In a glove box under an argon atmosphere, 1.379 gram of high purity lithium sulfide ($Li_2S$) and 2.222 grams of high purity diphosphorus pentasulfide ($P_2S_5$) that were commercially available were put in a zirconia pot for a planetary ball mill "P-7" (model number) manufactured by FRITCH at a molar ratio of 3:1. Next, 100 grams of a zirconia ball having a diameter of 5 mm were put in the pot. After that, 8 grams (11.7 ml) of normal heptane was put in a pot, and the pot was completely sealed.

With "drive of a mill for 60 minutes at a revolution number of 500 rpm, then rest for 15 minutes" as 1 cycle, a condition for performing 20 cycles was set, and mechanical milling was conducted for a total of 25 hours with the planetary ball mill. After that, normal heptane was volatilized in the glove box with the lid of the ball mill opened, to obtain a pale yellow glassy solid electrolyte powder.

Next, experimental examples relating to nonwoven fabrics and solid electrolyte-carrying sheets will be presented.

Example 1

Dispersed and mixed in water were: 65% by mass of B glass short fibers ("#100" manufactured by Johns-Manville Corporation) having a fiber diameter of 0.3 μm and a density of 2.5 g/cm³ as an inorganic fiber; 15% by mass of regular PET (polyethylene terephthalate) fibers ("TEPYRUS® TA04PN" manufactured by Teijin Limited) having a fineness of 0.1 dtex, a fiber diameter of 3 μm, a fiber length of 3 mm and a density of 1.37 g/cm³ as an organic fiber; and 20% by mass of core-sheath type PET-PET fibers ("CAS-VEN® 7080" manufactured by Unitika Ltd.) having a fineness of 1.1 dtex, a fiber length of 5 mm, a fiber diameter of 10 μm and a density of 1.37 g/cm³ as a 160° C.-thermally adhesive fiber. Subsequently, this mixture was subjected to wet papermaking using a test papermaking machine, and heated at a temperature of 200° C. in a dryer to obtain a nonwoven fabric. This nonwoven fabric is a nonwoven fabric having a basis weight of 2.8 g/m² and a thickness of 24 μm, in which a sheath portion of the core-sheath type PET-PET fiber is molten by the heating and the molten resin joins the fibers. The basis weight (g/m²) was determined in accordance with JIS P 8124 by measuring the mass of the nonwoven fabric having an area of 0.05 m² with a digital balance and multiplying the mass by 20. The thickness was measured in accordance with JIS P 8118 using "Dial Thickness Gauge" manufactured by OZAKI MFG. CO., LTD. under the condition of a pressurization force of 19.6 MPa (size q of the smaller surface of the parallel disk: 22.5 mm). The "regular PET" in the "regular PET fibers" means unmodified pure polyethylene terephthalate, and its melting point is 260° C.

The average fiber diameter L was calculated using the BET specific surface area of the nonwoven fabric and the average density obtained from the individual densities and blending ratios (volume %) of the raw material fibers, and found to be 1.8 μm. Further, from the densities of these raw material fibers, the occupied volume V of the fibers in the basis weight of 2.8 g/m² was calculated using the following formula, and found to be 1.44 (cm³/m²). The index of mesh opening ($L^2/V$) calculated using these values was 2.24.

Occupancy volume $V$(cm³/m²)=basis weight of nonwoven fabric (g/m²)×[{inorganic fiber blending ratio (% by mass)÷inorganic fiber density (g/cm³)}+{organic fiber blending ratio (% by mass)÷organic fiber density (g/cm³)}+{adhesive blending ratio (% by mass)÷adhesive density (g/cm³)}]÷100

Subsequently, a solid electrolyte-carrying sheet was manufactured by the following method, and various evaluations were performed.

The solid electrolyte powder obtained in Synthesis Example 1 (1.5 g) and normal heptane (3.75 g) as a dispersion medium were put in an agate mortar, and mixed while the solid electrolyte powder was ground. The obtained mixture (hereinafter, referred to as "mixed liquid") was put in a sample tube bottle and temporarily stored. The solid electrolyte particles in the mixed liquid have a particle diameter of about 10 μm. After that, a sheet made of PE was prepared as an underlay, the nonwoven fabric cut into 30 mm×90 mm was placed thereon, and 1 ml of the mixed liquid was dropped around the center of the nonwoven fabric, and applied using a commercially available film applicator (gap: 9 mil). The nonwoven fabric with a coating film was dried in the glove box for 2 hours to devolatilize the normal heptane.

Subsequently, the nonwoven fabric to which the solid electrolyte particles were attached was adjusted to a size of 30 mm×30 mm, and the nonwoven fabric was sandwiched between aluminum foils having a size of 40 mm×40 mm from the top and the bottom, and further sandwiched between two stainless steel plates, and pressed at 26 MPa (hereinafter, referred to as "low pressing") by a hydraulic press machine to immobilize the solid electrolyte particles to the entire nonwoven fabric including voids. After that, the stainless steel plates and the aluminum foils were removed to obtain a solid electrolyte-carrying sheet (thin sheet).

(1) Evaluation of Powder Falling Property

The solid electrolyte-carrying sheet was punched out into a circular shape (q 10 mm), and this product was used as a "test piece A". Then, the powder falling property was evaluated using the test piece A.

First, the weight (mg) of the test piece A was measured, and the test piece A was put in a columnar screw tube bottle (manufactured by Maruemu Corporation, No. 5, internal volume 20 ml), and the screw tube bottle was shaken 200 times with an amplitude of 150 mm in the minor axis direction (laterally). Then, the test piece A was taken out, the weight (mg) thereof was measured, and the weight loss was calculated (see Table 1). From this weight loss, the powder falling property was evaluated.

(2) Evaluation of Electrical Conductivity

A cell (diameter: 10 mm) for measuring resistance (electrical conductivity) was produced by the following method.

The above test piece A (q 10 mm) was filled in a polyether ether ketone (PEEK) cylindrical body (inner diameter: 10 mm), stainless steel pins having a flat surface with a diameter of 10 mm at a tip were then inserted from both sides of the cylindrical body to sandwich the test piece A, and the test piece A was pressed at 300 MPa (hereinafter, referred to as "high pressing") by a hydraulic press machine to obtain a "test piece B".

The resistance value ((2) was measured with an impedance measuring machine in a state where the test piece B was disposed inside the cylindrical body. The cell length (mm) before the insertion of the test piece A and the cell length (mm) after 300 MPa pressurization were measured with a micrometer, the thickness (μm) of the test piece B was calculated from the difference in cell length, and the electrical conductivity (S/cm) was calculated from the resistance value, and the diameter and thickness of the test piece B (see Table 1).

After the resistance value was measured, the test piece B was taken out from the cell, and visually observed. As a result, the solid electrolyte was sufficiently adhered to the fibers of the nonwoven fabric, and this state was the same as that when it was produced by high pressing, and cracking or chipping did not occur.

Although it was attempted to evaluate the electrical conductivity by the above method using only the solid electrolyte powder (5 mg) in the same amount as that of the solid electrolyte contained in the test piece A, the solid electrolyte powder could not be uniformly dispersed in the cell, and the measurement could not be performed due to a short circuit. In addition, when the test piece was taken out, the test piece was broken and could not be taken out.

Example 2

Dispersed and mixed in water were: 50% by mass of C glass short fibers ("#210X" manufactured by Johns-Manville Corporation) having a fiber diameter of 3 μm and a density of 2.5 g/cm$^3$, and 5% by mass of the above B glass short fibers ("#100" manufactured by Johns-Manville Corporation) as inorganic fibers; 15% by mass of regular PET fibers ("TEPYRUS TA04PN" manufactured by Teijin Limited) having a fineness of 0.06 dtex, a fiber diameter of 2 μm, a fiber length of 3 mm and a density of 1.37 g/cm$^3$ as organic fibers; and 30% by mass of the above core-sheath type PET-PET fibers ("CASVEN 7080" manufactured by Unitika Ltd.). Subsequently, this mixture was subjected to wet papermaking using a test papermaking machine, and heated at a temperature of 200° C. in a dryer to obtain a nonwoven fabric. The nonwoven fabric had a basis weight of 5.5 g/m$^2$, a thickness of 42 μm, an average fiber diameter of 4.2 μm, and an index of mesh opening of 5.85.

After that, this nonwoven fabric was used to manufacture a solid electrolyte-carrying sheet in the same manner as in Example 1, and various evaluations were performed (see Table 1).

Example 3

Dispersed and mixed in water were: 65% by mass of B glass short fibers ("B-X9-F" manufactured by Lauscha Fiber International Corporation) having a fiber diameter of 0.26 μm and a density of 2.5 g/cm$^3$ as inorganic fibers; 25% by mass of regular PET fibers ("TEPYRUS® TA04PN" manufactured by Teijin Limited) having a fineness of 0.06 dtex, a fiber diameter of 2 μm, a fiber length of 3 mm and a density of 1.37 g/cm$^3$ as organic fibers; and 10% by mass of the above core-sheath type PET-PET fibers ("CASVEN® 7080" manufactured by Unitika Ltd.). This mixture was subjected to wet papermaking using a test papermaking machine, and heated at a temperature of 200° C. in a dryer to obtain a nonwoven fabric. The nonwoven fabric had a basis weight of 2.6 g/m$^2$, a thickness of 19 μm, an average fiber diameter of 1.2 μm, and an index of mesh opening of 1.07.

After that, this nonwoven fabric was used to manufacture a solid electrolyte-carrying sheet in the same manner as in Example 1, and various evaluations were performed (see Table 1).

Example 4

Dispersed and mixed in water were: 45% by mass of the above B glass short fibers ("B-X9-F" manufactured by Lauscha Fiber International Corporation) as inorganic fibers; and 55% by mass of regular PET fibers ("TEPYRUS® TA04PN" manufactured by Teijin Limited) having a fineness of 0.06 dtex, a fiber diameter of 2 μm, a fiber length of 3 mm and a density of 1.37 g/cm$^3$ as organic fibers. This mixture was subjected to wet papermaking using a test papermaking machine, and heated at a temperature of 160° C. in a dryer to obtain a nonwoven fabric. The nonwoven fabric had a basis weight of 2.3 g/m$^2$, a thickness of 19 μm, an average fiber diameter of 1.0 μm, and an index of mesh opening of 0.75.

Example 5

Dispersed and mixed in water were: 25% by mass of the above B glass short fibers ("B-X9-F" manufactured by Lauscha Fiber International Corporation) and 25% by mass of the C glass short fibers ("C-04-F" manufactured by Lauscha Fiber International Corporation) having a fiber diameter of 0.53 μm and a density of 2.5 g/cm$^3$ as inorganic fibers; 50% by mass of regular PET fibers ("TEPYRUS® TA04PN" manufactured by Teijin Limited) having a fineness of 0.06 dtex, a fiber diameter of 2 μm, a fiber length of 3 mm and a density of 1.37 g/cm$^3$ as organic fibers. This mixture was subjected to wet papermaking using a test papermaking machine, and heated at a temperature of 200° C. in a dryer to obtain a nonwoven fabric. The basis weight of this nonwoven fabric was 5.0 g/m$^2$.

Subsequently, a styrene-butadiene resin (SBR) adhesive (density: 1.0 g/cm$^3$) was applied to the nonwoven fabric by a dip coater and dried to obtain a nonwoven fabric in which the fibers were bound by the adhesive. The nonwoven fabric had a basis weight of 5.6 g/m$^2$, a thickness of 30 μm, an average fiber diameter of 1.0 μm, and an index of mesh opening of 0.29. The amount of SBR attached was 10% by mass.

After that, this nonwoven fabric was used to manufacture a solid electrolyte-carrying sheet in the same manner as in Example 1, and various evaluations were performed (see Table 1).

Comparative Example 1

To an aqueous solution having a concentration of polyethylene oxide ("PEO-3" manufactured by Sumitomo Seika Chemicals Company, Limited) of 0.2% by mass as a thickener, 100% by mass of a glass chopped strand ("UPDE 1/4 ZA 508" manufactured by Unitika Ltd., E glass composition) having a fiber diameter of 7 μm, a fiber length of 6 mm, and a density of 2.5 g/cm$^3$ as inorganic fibers was added, dispersed and mixed. The mixture was subjected to wet papermaking using a test paper machine. Subsequently, the obtained wet paper web was sandwiched between upper and lower meshes, immersed in an acrylic resin emulsion ("VONCOAT® SFC" manufactured by Dainippon Ink and Chemicals, Inc., density: 1.2 g/cm$^3$) as an adhesive, dehydrated, and heated at a temperature of 160° C. in a dryer to obtain a nonwoven fabric in which fibers were bound by the adhesive. The nonwoven fabric contained the glass chopped strand and the acrylic resin in ratios of 92% by mass and 8% by mass, respectively, and had a basis weight of 9.5 g/m$^2$, a thickness of 75 μm, an average fiber diameter of 7.0 μm, and an index of mesh opening of 11.87.

After that, this nonwoven fabric was used to manufacture a solid electrolyte-carrying sheet in the same manner as in Example 1, and various evaluations were performed (see Table 1).

Comparative Example 2

Dispersed and mixed in water were: 30% by mass of the above B glass short fibers ("#100" manufactured by Johns-Manville Corporation) and 30% by mass of the above C glass short fibers ("C-04-F" manufactured by Lauscha Fiber International Corporation) as inorganic fibers; 40% by mass of regular PET fibers ("TEPYRUS® TA04PN" manufactured by Teijin Limited) having a fineness of 0.06 dtex, a fiber diameter of 2 µm, a fiber length of 3 mm and a density of 1.37 g/cm³ as organic fibers. This mixture was subjected to wet papermaking using a test papermaking machine, and heated at a temperature of 200° C. in a dryer to obtain a nonwoven fabric. The nonwoven fabric had a basis weight of 10.0 g/m², a thickness of 60 µm, an average fiber diameter of 0.8 µm, and an index of mesh opening of 0.13.

After that, this nonwoven fabric was used to manufacture a solid electrolyte-carrying sheet in the same manner as in Example 1, and various evaluations were performed (see Table 1).

Comparative Example 3

The above acrylic resin emulsion (density: 1.2 g/cm³) was applied to the nonwoven fabric produced in Comparative Example 2 by a dip coater and dried to obtain a nonwoven fabric in which fibers were bound by the adhesive. The nonwoven fabric had a basis weight of 11.1 g/m², a thickness of 60 µm, an average fiber diameter of 0.8 µm, and an index of mesh opening of 0.11. The amount of the acrylic resin attached was 10% by mass.

After that, this nonwoven fabric was used to manufacture a solid electrolyte-carrying sheet in the same manner as in Example 1, and various evaluations were performed (see Table 1).

Comparative Example 4

Dispersed and mixed in water were: 70% by mass of the above glass chopped strand (manufactured by Unitika Ltd.) as inorganic fibers; 20% by mass of regular PET fibers ("TEPYRUS® TA04PN" manufactured by Teijin Limited) having a fineness of 0.1 dtex, a fiber diameter of 3 µm, a fiber length of 3 mm and a density of 1.37 g/cm³ as organic fibers; and 10% by mass of core-sheath type PET-PET fibers ("CASVEN® 7080" manufactured by Unitika Ltd.) having a fineness of 1.1 dtex, a fiber length of 5 mm, a fiber diameter of 10 µm and a density of 1.37 g/cm³ as 160° C. thermally adhesive fibers. This mixture was subjected to wet papermaking using a test papermaking machine, and heated at a temperature of 200° C. in a dryer to obtain a nonwoven fabric. The nonwoven fabric had a basis weight of 8.0 g/m², a thickness of 55 µm, an average fiber diameter of 6.7 µm, and an index of mesh opening of 11.25.

After that, this nonwoven fabric was used to manufacture a solid electrolyte-carrying sheet in the same manner as in Example 1, and various evaluations were performed (see Table 1).

From the results in Table 1, Examples 1 to 5 are examples in which the index of mesh opening falls within the range of the present invention, and it can be seen that the powder falling from the solid electrolyte-carrying sheet (thin sheet) before high pressing is 10% by mass or less; that the electrical conductivity of the solid electrolyte-carrying sheet after high pressing is also sufficiently high; and that these examples achieve all of these performances.

INDUSTRIAL APPLICABILITY

The nonwoven fabric of the present invention is used, so that the voids are easily filled with the solid electrolyte particles, and the solid electrolyte-carrying sheet can be easily formed. The obtained solid electrolyte-carrying sheet has a suppressed powder falling property of the solid electrolyte particles, and thus is suitable, as a solid electrolyte-carrying sheet having the intended conductivity, as a member for manufacturing an all-solid-state lithium-ion battery.

The invention claimed is:

1. A nonwoven fabric, comprising: (F1) fibers having a fiber diameter of 1.0 µm or thinner and (F2) fibers having a fiber diameter of thicker than 1.0 µm; wherein
the fibers (F1) comprise an inorganic fiber, wherein the inorganic fiber consists essentially of an inorganic compound and is not a cellulose nanofiber, and
the nonwoven fabric satisfies:

$$1.0 \le L^2/V \le 10$$

where
L is an average fiber diameter of all fibers of the nonwoven fabric in µm, and
V is an occupied volume cm³/m² of all the fibers of the nonwoven fabric.

2. The nonwoven fabric according to claim 1, wherein the average fiber diameter is 0.85 µm or thicker.

3. The nonwoven fabric according to claim 1, wherein the fibers (F2) comprise a resin fiber.

4. The nonwoven fabric according to claim 3, wherein the fibers (F2) further comprise an inorganic fiber.

5. The nonwoven fabric according to claim 3, wherein at least some of the resin fibers join the fibers constituting the nonwoven fabric.

TABLE 1

| | | Nonwoven fabric | | | Solid electrolyte-carrying sheet (dimension: diameter 10 mm) | | | | |
| | | Property | | | Evaluation after low pressing | | | | |
| | | Average | Occupied | Index of | Powder | Amount | | Evaluation after high pressing | |
| | | fiber diameter (µm) L | volume (cm³/m²) V | mesh opening L^2/V | falling property (% by mass) | of solid electrolyte carried | Thickness (µm) | Resistance (Ω) | Conductivity (S/cm) |
|---|---|---|---|---|---|---|---|---|---|
| Ex- | 1 | 1.8 | 1.44 | 2.24 | 8 | 4.2 mg/φ10 mm 53 g/m² | 35 | 29 | 1.5E−04 |
| am- | 2 | 4.2 | 3.02 | 5.85 | 10 | 5.4 mg/φ10 mm 69 g/m² | 48 | 45 | 1.4E−04 |
| ple | 3 | 1.2 | 1.34 | 1.07 | 7 | 5.1 mg/φ10 mm 65 g/m² | 46 | 40 | 1.5E−04 |
| | 4 | 1.0 | 1.34 | 0.75 | 6 | 4.2 mg/φ10 mm 53 g/m² | 40 | 54 | 9.4E−05 |
| | 5 | 1.0 | 3.41 | 0.29 | 7 | 5.0 mg/φ10 mm 64 g/m² | 36 | 296 | 1.5E−05 |
| Com- | 1 | 7.0 | 4.13 | 11.87 | 19 | 4.9 mg/φ10 mm 62 g/m² | 46 | 35 | 1.7E−04 |
| parative | 2 | 0.8 | 5.32 | 0.13 | 13 | 5.1 mg/φ10 mm 65 g/m² | 55 | 3272 | 2.1E−06 |
| Exam- | 3 | 0.8 | 6.24 | 0.11 | 12 | 4.3 mg/φ10 mm 55 g/m² | 55 | 4418 | 1.6E−06 |
| ple | 4 | 6.7 | 3.99 | 11.25 | 19 | 5.6 mg/φ10 mm 71 g/m² | 60 | 38 | 2.0E−04 |

6. A solid electrolyte-carrying sheet, comprising
the nonwoven fabric according to claim 1, and
solid electrolyte particles carried between the (F1) fibers
and the (F2) fibers constituting the nonwoven.

7. The solid electrolyte-carrying sheet according to claim
6, wherein an amount of the solid electrolyte particles
carried is in a range from 10 to 200 g/m$^2$.

8. A method comprising:
providing the nonwoven fabric according to claim 1, and
forming a solid electrolyte-carrying sheet by introducing
solid electrolyte particles into voids between the (F1)
fibers and the (F2) fibers of the nonwoven fabric.

9. A nonwoven fabric, comprising: (F1) fibers having a
fiber diameter of 1.0 μm or thinner and (F2) fibers having a
fiber diameter of thicker than 1.0 μm; wherein
the fibers (F1) are selected from the group consisting of a
mineral fiber, a glass fiber, a silica fiber, an alumina
fiber, a silica-alumina fiber, a silica-alumina-magnesia
fiber, a silica-alumina-zirconia fiber, a silica-magnesia-
calcia fiber, a rock wool, a slag wool, a potassium
titanate whisker, a calcium carbonate whisker, a basalt
fiber, sepiolite and attapulgite, and
the nonwoven fabric satisfies:

$$1.0 \leq L^2/V \leq 10$$

where
L is an average fiber diameter of all fibers of the
nonwoven fabric in μm, and
V is an occupied volume cm$^3$/m$^2$ of all the fibers of the
nonwoven fabric.

\* \* \* \* \*